United States Patent Office 3,119,810
Patented Jan. 28, 1964

---

3,119,810
CATIONIC AZO DYES
Mario Francesco Sartori, Wilmington, Del., assignor to E. I. du Pont de Nemours and Company, Wilmington, Del., a corporation of Delaware
No Drawing. Filed May 25, 1959, Ser. No. 815,258
3 Claims. (Cl. 260—163)

This invention relates to novel water-soluble, organic compounds which are useful as dyes for acid-modified acrylic and polyester fibers. By acrylic fiber or acid-modified acrylic fiber, throughout this specification and claims, I mean acrylic fiber having acid sites; for instance, the sulfonate modified acrylic fibers described in U.S.P. 2,837,500 and 2,837,501. By acid-modified polyester fiber, I mean polyethylene terephthalate fiber containing metal-sulfonate groups, as described more fully in Belgian Patent No. 549,179, granted July 14, 1957.

It is an object of this invention to provide novel cationic azo dyes useful for dyeing the aforementioned fibers, but which are particularly characterized by proton stability of shade. By the latter term I mean that the shade of the dyeing on the aforementioned fibers does not change perceptibly with change of H-ion concentration in the acid dye bath employed. Other objects and achievements of this invention will become apparent as the description proceeds.

Water-soluble, cationic azo dyes as a class are not new. In U.S.P. 2,821,526 (issued to Samuel N. Boyd, Jr.) compounds of this general class are set forth which may be expressed by the general formula

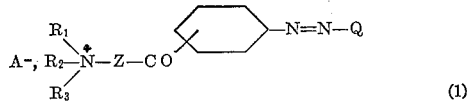

(1)

Full details as to the symbols involved may be found in the patent, but at this point it may suffice to say, by way of summary, that $R_1$, $R_2$ and $R_3$ represent alkyl or substituted alkyl groups; $A^-$ is the anion of a water-soluble acid; the group —Z—CO— represents a short-chain aliphatic acyl radical; the benzene ring shown may contain substituents common in azo dye components, for instance lower alkyl, chlorine, bromine or alkoxy; and Q is a final component, which is defined in said patent by the group

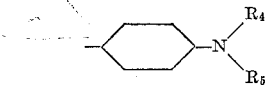

wherein the phenyl nucleus again may contain substituents as are common in azo components, while $R_4$ and $R_5$ may represent hydrogen, lower alkyl, hydroxyalkyl, acetoethyl, cyanoethyl or phenyl.

The said cationic azo compounds have been indicated in said patent as useful for rapid and direct dyeing of acrylic fiber or union fabrics containing such fiber. The dyeings thus obtained were yellow-orange to red-violet in shade and were found there to possess good wash-fastness and light-fastness.

The patent, however, admitted one weakness in said colors, namely: They possess the properties of indicators, and the shade of dyeing obtained with the same compound will generally vary from more (or less) yellow to more (or less) red depending on the hydrogen-ion concentration of the acid dye bath employed. Such variability of the dyeings is generally spoken of as lack of proton stability of shade.

I have now found that hydrolytically stable, water-soluble, cationic azo dyes of excellent proton stability, in addition to having good light-fastness and wash-fastness qualities and other valuable properties, can be obtained if for the final component Q in the above general formula is chosen a pyrazolone compound, such as 3-methyl-5-pyrazolone, 1-phenyl-3-methyl-5-pyrazolone, or 1-chlorophenyl-3-methyl - 5 - pyrazolone. Furthermore, the compound may be a diazo compound formed by interposing an extra phenyl-azo group between the azo bridge and member Q in Formula 1 above, without affecting the proton stability of the compound.

Accordingly, my present invention contemplates a series of novel compounds of the general formulas

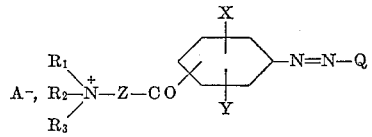

and

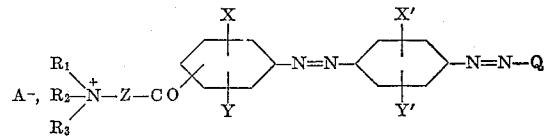

wherein Q is the coupling radical of a 3-methyl-5-pyrazolone compound such as 3-methyl-5-pyrazolone, 1-phenyl-3-methyl - 5 - pyrazolone or 1-chlorophenyl - 3 - methyl-5-pyrazolone, X and Y are members of the group consisting of hydrogen, alkyl, chlorine and bromine, X' and Y' are members of the group consisting of hydrogen, alkyl, alkoxy, chlorine and bromine, said alkyl and alkoxy members being radicals of 1 to 4 C-atoms, Z is an alkylene radical having from 1 to 3 C-atoms, $R_1$ is an alkyl radical, $R_2$ is a radical of the group consisting of alkyl and hydroxyalkyl, $R_3$ is a radical of the group consisting of alkyl, hydroxyalkyl and benzyl, said alkyl and hydroxyalkyl members being radicals of 1 to 4 C-atoms, and $A^-$ is a water-solubilizing anion such as chloride, bromide, sulfate, phosphate, acetate or p-toluene-sulfonate.

My novel monoazo compounds may be prepared by diazotizing in conventional manner a monoquaternary diamine of formula

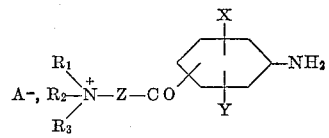

wherein X, Y, Z, $R_1$, $R_2$ and $R_3$ have the same significance as above, while $A^-$ is the anion of a strong mineral acid (such as hydrochloric or sulfuric acid), and coupling the obtained diazo compound, in alkaline aqueous medium and at a temperature of about 5° to 10° C. to a pyrazolone compound of form Q as above defined. In the cases where a diazo compound is desired, the same may be prepared by coupling the diazo compound obtained as above, in acid medium, to a compound of the formula

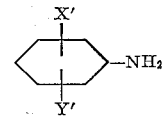

(as defined above), then diazotizing again and coupling in alkaline aqueous medium to a pyrazolone compound of form Q (as above defined).

The final monoazo or disazo dye thus produced, which is sparingly soluble in cold water, may be recovered directly by filtration. The requisite initial monoquaternary diamine may be prepared as in Examples IX, XI, XII, XIV(a) and XV(a) of said Boyd patent.

Application of the novel dyes to acrylic or acid-modified polyester fiber may be made from an acid aqueous bath at about pH 4 to 5, at customary dyeing temperatures (180° to 212° F.). Application to union fabrics containing one of the above synthetic fibers and wool is carried out advantageously at 212° F. in a dye bath containing about 2% (by weight of the fiber) of glacial acetic acid, 2% of sodium acetate and 2% of a non-ionic surface active agent, such as Emulphor ON (a condensation product of oleyl alcohol or cetyl alcohol with ethylene oxide). The dyeings thus obtained are bright, fast, hydrolytically stable, shade stable, and they build up to heavy shades on these fibers.

Without limiting this invention, the following examples are given to illustrate my preferred mode of operation. Parts mentioned are by weight.

*Example 1*

22.8 parts of (p-aminophenacyl)trimethylammonium chloride (Example IX(b) of U.S.P. 2,821,526) is diazotized in conventional manner and coupled in aqueous medium, at pH 8 to 9 and at a temperature of 5° to 10° C., to 9.8 parts of 3-methyl-5-pyrazolone. The resulting slurry is stirred at 5° to 10° C. for 8 hours, then for 16 hours at room temperature. The precipitate is then filtered off, washed with 10% sodium chloride aqueous solution and dried. The dye thus obtained has the structure

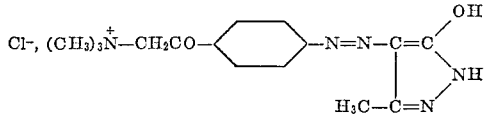

It is a yellow powder, which dissolves in water to give a yellow solution. The absorption maximum in ethanol is located at 410 millimicrons. It dyes acrylic fibers and acid-modified polyester fibers in bright yellow shades of very good fastness properties.

When the (p-aminophenacyl)trimethylammonium chloride of this example is replaced by 24.2 parts of [2-(p-aminobenzoyl)ethyl]trimethylammonium chloride, prepared as described in Example XIV(a) of U.S.P. 2,821,526, a similar yellow dye for acrylic fiber is obtained.

Likewise, when said p-amino compound of this example is replaced with 34.0 parts of [3-(p-aminobenzoyl)-propyl]triethylammonium bromide (prepared by the method of H. W. Linnell and S. V. Vora, Journal of Pharmacy and Pharmacology, volume 4, No. 1, pages 62–64, 1952) or with 24.2 parts of (p-amino-alpha-methlphenacyl)trimethylammonium chloride (prepared as in Example XV(a) of U.S.P. 2,821,526), products are obtained which dye acrylic fiber in yellow shades.

*Example 2*

A solution of diazotized (p-aminophenacyl)trimethylammonium chloride, prepared as described in Example 1, is added in about 30 minutes to a stirred aqueous solution of 17.4 parts of 3-methyl-1-phenyl-5-pyrazolone, 3 parts of sodium hydroxide and 12 parts of sodium carbonate in 100 parts of water, while maintaining the temperature of the reaction mixture at 5° to 10° C. The pH is maintained at 8 to 9 by the addition of sodium carbonate. The slurry is stirred and the dye isolated as described in Example 1. It has the formula

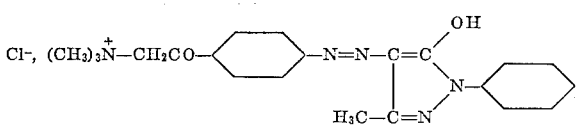

It dyes acrylic fibers and acid-modified polyester fibers in orange-yellow shades of good fastness properties.

The absorption maximum of this dye in ethanol is located at 398 millimicrons.

*Example 3*

30 parts of p-acetaminophenacyl-dimethyl-(beta-hydroxyethyl)ammonium chloride are diazotized in the usual manner and coupled, as in Example 1 to 9.8 parts of 3-methyl-5-pyrazolone. The precipitate is filtered off, washed and dried to yield a yellow powder of the formula

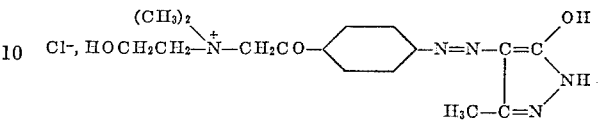

It dyes acrylic fibers yellow shades of good fastness properties.

When the p-acetaminophenacyl-dimethyl-(beta-hydroxyethyl)ammonium chloride in this example is replaced by an equivalent amount of p-acetaminophenacyl-methyl-bis-(beta-hydroxyethyl)ammonium chloride, a yellow basic dye is obtained of the formula

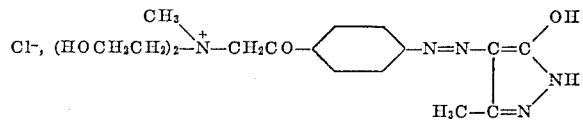

It dyes acrylic fibers in yellow shades of good fastness properties.

Likewise, when the 3-methyl-5-pyrazolone in this example and its alternatives is replaced by an equivalent amount of 3-methyl-1-phenyl-5-pyrazolone, orange-yellow dyes of similar shades are obtained.

*Example 4*

In a similar manner as in the above examples, the following combinations of diazo and coupling components may be synthesized to give yellow dyes which exhibit excellent fastness properties on acrylic fibers.

| | Diazo Component | Coupling Component |
|---|---|---|
| (a) | (4-amino-3-bromophenacyl)-trimethylammonium chloride. | 3-methyl-5-pyrazolone. |
| (b) | ----do---- | 3-methyl-1-phenyl-5-pyrazolone. |
| (c) | 4-amino-2,5-dimethylphenacyl)-trimethylammonium chloride. | 3-methyl-1-(m-chlorophenyl)-5-pyrazolone. |
| (d) | ----do---- | 3-methyl-5-pyrazolone. |
| (e) | (4-amino-2-chlorophenacyl)-trimethylammonium chloride. | Do. |
| (f) | ----do---- | 3-methyl-1-(p-chlorophenyl)-5-pyrazolone. |
| (g) | (4-amino-3, 5-dibromophenacyl)-trimethylammonium chloride. | 3-methyl-5-pyrazolone. |
| (h) | ----do---- | 3-methyl-1-phenyl-5-pyrazolone. |

The diazo components listed in this table are prepared as described, respectively, in Examples XI, IX(e), IX(d) and XII of U.S.P. 2,821,526. In lieu of these, those mentioned at the end of Example 1 above (wherein Z is an alkylene other than CH₂) may also be used, as well as the p-aminophenacyl-(benzyl)-dimethylammonium chloride disclosed in Example V of said patent.

*Example 5*

22.8 parts of (p-aminophenacyl)trimethylammonium chloride is diazotized in conventional manner and then added with stirring at 10° C. to a solution of 10.8 parts of m-toluidine in 5% hydrochloric acid, followed by the addition of sodium acetate to keep the pH at 1 to 2.

The mixture is stirred at 10° C. for 5 hours and then at the ambient temperature for 8 hours, salted with 10% by weight of sodium chloride, and filtered. The orange filter cake is washed with 10% by weight of aqueous sodium chloride solution. The cake is then dissolved in 1000 parts of water and 50 parts of 36% hydrochloric acid by heating at 80° C. The resulting solution is stirred and cooled with ice to 5° to 10° C. and the amine is diazotized by the addition of 6.9 parts of sodium nitrite. An excess of nitrous acid is maintained for 0.5 hour and is then destroyed by the addition of sulfamic acid. The solution is then added during about 30 minutes to a stirred solution of 9.8 parts of 3-methyl-5-pyrazolone in 200 parts of water, containing 4 parts of sodium hydroxide and 40 parts sodium carbonate. During this addition the reaction mixture is maintained at 5° to 10° C. with ice and at pH 8 to 9 by the addition of sodium carbonate. The slurry is stirred for 2 hours at 5° to 10° C., then 16 hours at the ambient temperature. The precipitate is filtered off, washed acid-free and dried to give an orange powder. The dye obtained has the formula

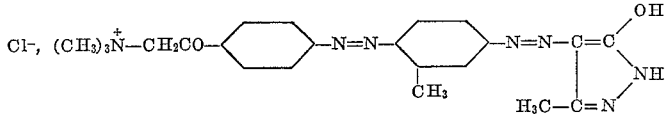

This product dyes acrylic fiber and acid-modified polyester fiber orange shades of excellent fastness properties.

The shade of the dye does not change with a change in the acidity of the dye bath from pH 3 to pH 7. Without the second diazotization and coupling with methyl pyrazolone, the dye applied from a bath at pH 3 is red and at pH 7 is orange.

*Example 6*

The procedure is as in Example 5, except that the intermediate aminoazo compound prepared for diazotization and coupling to methyl pyrazolone is itself prepared from diazotized (m-aminophenacyl)trimethylammonium chloride and 2,5-dichloroaniline. The final product therefore corresponds to the formula

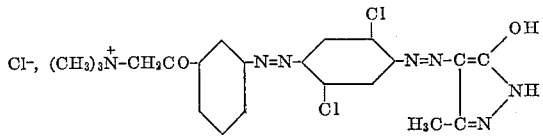

The product dyes acrylic and acid-modified polyester fiber in orange shades of good fastness properties.

*Example 7*

The procedure is as in Example 6, except that in the first coupling, 2,5-dichloroaniline is replaced by the equivalent quantity of 5-methyl-o-anisidine. The resulting product has the same dyeing qualities as those of Examples 5 and 6.

It will be understood that the details of the above examples can be varied widely without departing from the spirit of this invention. For instance, the Cl anions indicated in the above formulas may be replaced by other anions of water-soluble salts, which may be inorganic or organic and may be further illustrated by the anions of acetic, sulfuric, phosphoric acid, etc. Such replacement may be made in the initial choice of the corresponding monoquaternary diamine; for instance, one may start in Example 1 with (p-aminophenacyl)trimethylammonium sulfate or phosphate, and carry out the diazotization by the aid of sulfuric or phosphoric acid, respectively. Or the final dye may be subjected to the customary reaction of exchange with an optional acid. Altogether, the nature of the anion in the dye is not critical as long as it renders the dye soluble in water.

Many other variations in detail will be readily apparent to those skilled in the art.

The advantages of this invention will now be readily apparent. My novel compounds possess a combination of useful properties, including water-solubility, hydrolytic and proton stability, good build up, good brightness, carbonization fastness and remarkable light-fastness properties.

Hydrolytic stability implies that the dye is not decomposed by water, whether in acid, neutral or alkaline bath.

The significance of carbonization fastness will become apparent from the following mode of testing for the same. The test is applied to a union fabric comprising wool and acrylic or acid-modified polyester fiber, and consists essentially of a hot treatment of the fabric with sulfuric acid of about 3% concentration for the purpose of removing extraneous matter from the wool. The wool in the mixed goods is first dyed with a so-called neutral dyeing color such as a 1:2 metallized azo dye. Then the mixed goods are dyed with a cationic dye (for instance the novel compounds of this application), to color the acid-modified polyester or acrylic fiber present. If the cationic dye has poor proton stability, its true shade is altered considerably as a result of the low pH reached in the subsequent carbonization treatment. Some cationic dyes recover their true shade upon neutralization of the carbonized and dyed fabric. Others are poor in their shade recovery. Shade stability or sensitivity to the acid before neutralization is also important. The dyes of this invention pass both tests quite well, i.e., there is no shade change in dye baths at low pH, and the very small shift in shade caused by the carbonization treatment is completely recovered in the neutralization step.

I claim is my invention:

1. A compound selected from those compounds having the formulas:

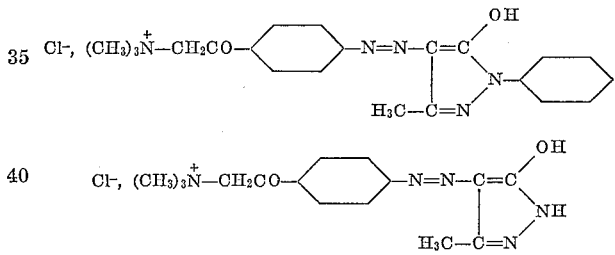

and

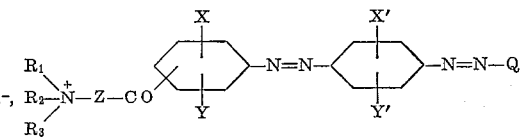

wherein Q is the coupling radical of a pyrazolone compound selected from the group consisting of 3-methyl-5-pyrazolone, 1-phenyl-3-methyl-5-pyrazolone and 1-chlorophenyl-3-methyl-5-pyrazolone, X and Y are members of the group consisting of hydrogen, alkyl, chlorine and bromine, X' and Y' are members of the group consisting of hydrogen, alkyl, alkoxy, chlorine and bromine, said alkyl and alkoxy members being radicals of 1 to 4 C-atoms, Z is an alkylene radical having from 1 to 3 C-atoms, $R_1$ is an alkyl radical, $R_2$ is a radical of the group consisting of alkyl and hydroxyalkyl, $R_3$ is a radical of the group consisting of alkyl, hydroxyalkyl and benzyl, said alkyl and hydroxyalkyl members being radicals of 1 to 4 C-atoms and $A^-$ is a water-solubilizing anion.

2. A compound of the formula

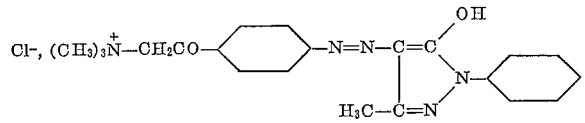

3. A compound of the formula
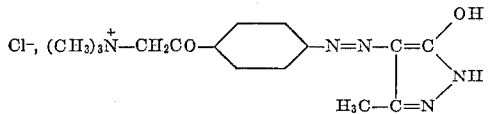
References Cited in the file of this patent
UNITED STATES PATENTS
| | | |
|---|---|---|
| 1,660,097 | Schmid | Feb. 21, 1928 |
| 2,012,553 | Thoma | Aug. 27, 1935 |
| 2,764,466 | Bidgood | Sept. 25, 1956 |
| 2,772,943 | Hiller | Dec. 4, 1956 |
| 2,821,526 | Boyd | Jan. 28, 1958 |
| 2,832,764 | Huenig | Apr. 29, 1958 |
| 2,864,812 | Bossard | Dec. 16, 1958 |
| 2,898,178 | Kruckenberg | Aug. 4, 1959 |
| 2,913,303 | Baumann | Nov. 17, 1959 |
FOREIGN PATENTS
| | | |
|---|---|---|
| 808,713 | Great Britain | Feb. 11, 1959 |
OTHER REFERENCES
Colour Index, second edition, 1956, Society of Dyers and Colourists, vol. 1, page 1623, entry CI 11270.
Ibid., vol. 3, page 3018, entry CI 11270.